United States Patent [19]

Sofianek

[11] Patent Number: 4,796,855

[45] Date of Patent: Jan. 10, 1989

[54] PWM ELECTROMAGNETIC VALVE WITH SELECTIVE CASE HARDENING

[75] Inventor: Jay K. Sofianek, Livonia, N.Y.

[73] Assignee: General Motors Corporation, Detroit, Mich.

[21] Appl. No.: 168,483

[22] Filed: Mar. 15, 1988

[51] Int. Cl.⁴ .............................................. F16K 31/06
[52] U.S. Cl. ......................... 251/129.15; 251/129.21; 251/368
[58] Field of Search ..................... 251/129.15, 129.21, 251/368; 239/585

[56] References Cited

U.S. PATENT DOCUMENTS 3,683,965 8/1972 McClure et al. ............... 251/368 X 4,231,525 11/1980 Palma .................................. 239/585

*Primary Examiner*—Arnold Rosenthal
*Attorney, Agent, or Firm*—Mark A. Navarre

[57] ABSTRACT

The armature and active seat of an electromagnetic PWM valve are selectively case hardened at their contacting surfaces to a case depth of approximately 0.50 mm. The hardened areas provide hard contacting surfaces for superior durability, and moreover, create an effective air gap between the armature and the active seat to substantially prevent residual magnetism therebetween. The remaining surfaces of the armature and seat assembly are not hardened, and serve as a low reluctance magnetic flux path around the hardened areas.

4 Claims, 1 Drawing Sheet

U.S. Patent
Jan. 10, 1989
4,796,855
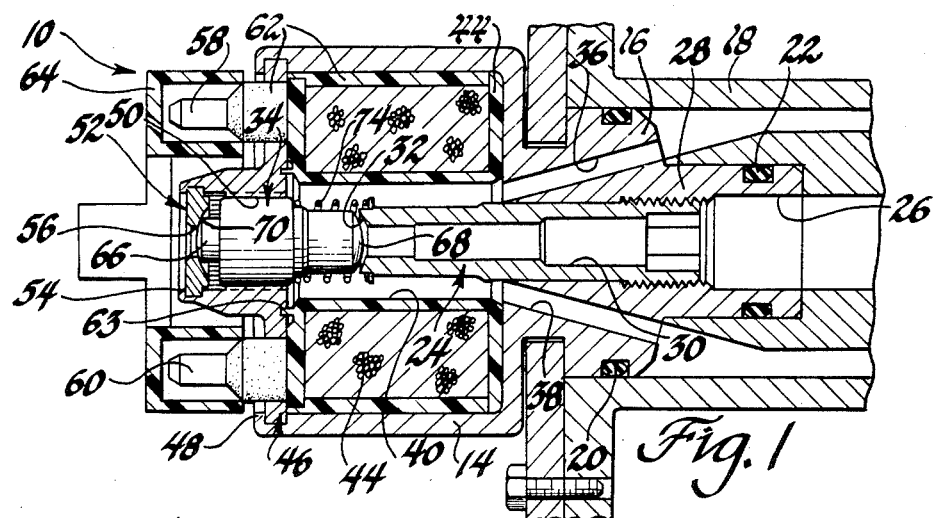
Fig.1
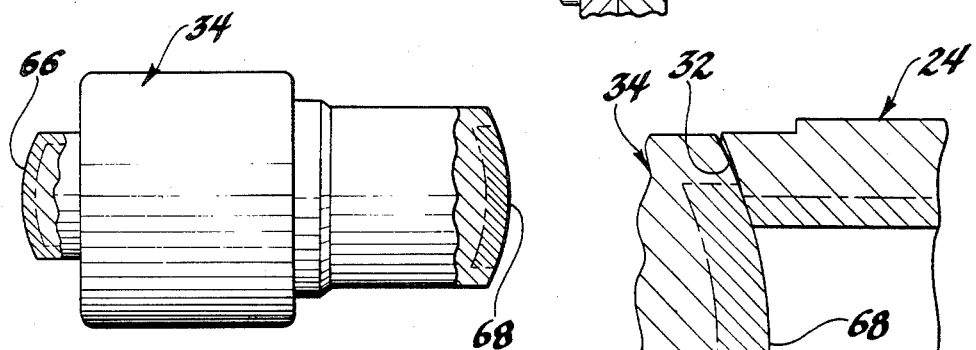
Fig.2
Fig.3
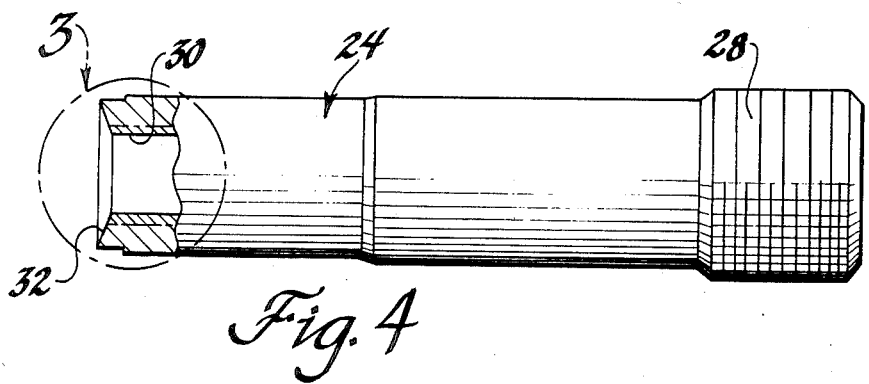
Fig.4

PWM ELECTROMAGNETIC VALVE WITH SELECTIVE CASE HARDENING

This invention relates to pulse-width-modulated (PWM) electromagnetic valves of the type used to supply a regulated fluid pressure in an automotive power transmission, and more particularly to an apparatus and method of manufacture for improving the durability and speed of response of such a valve.

BACKGROUND OF THE INVENTION

Fluid pressure regulating PWM electromagnetic valves generally comprise a magnetic armature element, a spring or other resilient means for biasing the armature into engagement with a rest seat, and a magnetic circuit that is adapted when activated to develop an armature attracting force which opposes the spring force and moves the armature into engagement with an active seat. In a normally open valve, the rest seat is referred to as the exhaust seat, the active seat as the supply seat; in a normally closed valve, the rest seat is referred to as the supply seat, the active seat as the exhaust seat.

In valves of the above type, the armature and active seat must exhibit magnetic characteristics since they form part of the magnetic circuit. However, response considerations dictate against direct contact between an active magnetic seat and armature. With such direct contact, the armature and active seat tend to become residually magnetized, requiring relatively high spring force to return the armature to its rest position upon deenergization of the magnetic circuit. High spring forces are also undesirable since higher magnetic forces are required to unseat the armature at each energization of the magnetic circuit. Both residual magnetism and high spring forces are particularly undesirable in valves intended for high speed modulation.

One technique for overcoming the response tradeoff described above is to coat the contacting surfaces of the armature or seat with a nonmagnetic material such as copper. The coated element retains its magnetic characteristics, and the residual magnetism problem is avoided because the coating creates an effective magnetic air gap between the armature and seat. However, this technique tends to degrade the durability of the valve because the coating is generally relatively soft, and tends to wear out long before the useful life of the valve, especially when the contacting surfaces cannot be rotated or indexed to distribute the wear.

Another technique for overcoming the response tradeoff is to fasten a nonmagnetic insert on the active seat. However, this technique is undesirable since it significantly increases the cost and complexity of assembly.

SUMMARY OF THE PRESENT INVENTION

The present invention is directed to an improved electromagnetic valve which exhibits superior durability and response characteristics without the use of soft nonmagnetic coatings or nonmagnetic inserts.

According to the present invention, the armature and the active seat are formed of iron or low carbon steel materials which exhibit superior magnetic characteristics. Such parts are selectively hardened at their contacting surfaces to a case depth of approximately 0.50 mm. The hardened areas provide hard contacting surfaces for superior durability, and moreover, create an effective air gap between the armature and seat to prevent residual magnetism of the armature. The remaining surfaces of the armature and seat assembly are not hardened, and serve as a low reluctance magnetic flux path around the hardened areas.

The selective case hardening of the armature and active seat areas maybe achieved by carburizing the entire parts and removing the case by grinding in all areas except the areas of contact. The resulting valve has none of the durability and assembly disadvantages of soft coatings and inserts; it exhibits superior durability and response.

BRIEF DESCRIPTION OF THE DRAWINGS

FIG. 1 is a partial cross section of an electromagnetic fluid valve made in accordance with this invention.

FIGS. 2-4 further detail the armature and seat of the valve depicted in FIG. 1.

DETAILED DESCRIPTION OF THE DRAWINGS

Referring particularly to FIG. 1, the reference numeral 10 generally designates a normally open PWM electromagnetic fluid pressure control valve according to this invention. The valve 10 includes a magnetic housing having a body portion 14, and a stem portion 16 adapted to be received within the valve body 18 of a automotive transmission. O-rings 20 and 22 prevent fluid leakage around the stem portion 16.

A cylindrical seat stem 24 is disposed within a central housing opening 26, and may be axially adjustable therein by a threaded coupling 28 for flow adjustment if so desired. The seat stem 24 defines a central fluid inlet passage 30 and a supply seat surface 32 adapted to be engaged by an armature 34 as described below. A pair of fluid outlet passages 36 and 38 drilled through the housing stem portion 16 connect the interior of transmission valve body 18 to an inner cavity 40 of the housing body portion 14.

An electrical coil 42 and insulating bobbin 44 are retained within the housing body portion 14 by a magnetic cover plate 46 retained by the housing lip 48. The armature 34 is slidably disposed within a fluted bore 50 of cover plate 46, and retained therein by a nonmagnetic stainless steel exhaust seat 52, which in turn, is retained by the cover plate lip 54. Exhaust seat 52 has a central fluid outlet passage 56 formed therein which defines the exhaust port of the valve 10. The cover plate 46 also includes a pair of openings through which the coil terminals 58 and 60 extend.

An injection molded insulating material 62 surrounds the terminals 58 and 60, as well as the space between the coil 42 and housing body portion 14 to seal the coil 42 and the inner cavity 40. An annular bobbin tab 63 received within a corresponding groove in the cover plate 46 provides a shut-off for the material 62, and permits the molding process to be performed subsequent to assembly of the valve. The reference numeral 64 designates an electrical connector for installations in which the valve 10 may be submerged in fluid.

The armature 34 includes generally elliptical end surfaces 66, 68 adapted to engage generally spherical seating surfaces 70, 32 formed on exhaust seat 52 and seat stem 24. A high rate spring 74 seated between the seat stem 24 and the armature 34 urges the armature end surface 66 into engagement with the exhaust seat surface 70.

When the coil 42 is deenergized, the spring 74 maintains armature 34 in the position depicted in FIG. 1, sealing the armature end surface 66 against the exhaust seat surface 70. In such case, inlet fluid supplied to the inlet passage 30 of seat stem 24 flows across the armature end surface 68 and through the outlet passages 36 and 38.

When the coil 42 is energized, magnetic flux flows through a path comprising the housing body portion 14, the cover plate 46, the armature 34, the seat stem 24 and the air gap between armature 34 and seat stem 24. Such flux draws the armature 34 rightward, as viewed in FIG. 1, against the force of spring 74, sealing the armature end surface 68 against the supply seat surface 32. In such case, the fluid flow in inlet passage 30 is halted, and fluid from the valve body 18 is exhausted through the outlet passages 36 and 38, the fluted bore 50 of cover plate 46 and the outlet passage 56 of exhaust seat 52.

In usage, the coil 42 is pulse-width-modulated between its energized and deenergized states described above. The duty cycle of the modulation is varied to adjust the average pressure thereby supplied in the valve body 18 at the outlet passages 36 and 38, such pressure being inversely proportional to the duty cycle for the normally open valve 10 depicted in FIG. 1.

The response time of a valve—that is, the time required to move the armature from its rest position to its energized position, and vice versa—limits the frequency and duty cycle of modulation. For the best performance, the response time should be as short as possible. As indicated above, the response time is often limited by the spring force required to move the armature to its rest position upon deenergization of the coil. If the spring force must be high to overcome residual magnetic attraction between the armature and the active seat, higher magnetic forces must be used as well. Higher magnetic forces, in turn, increase residual magnetism, weight, size and energy requirements.

This invention addresses the above problem by selectively case hardening the areas of direct contact on the armature and the active seat. This results in an extremely durable valve, and establishes an effective air gap at such areas of direct contact to substantially eliminate the problem of residual magnetism. The magnetic flux during energization of the coil flows around the hardened areas across small physical air gaps to maintain the armature in its seated position. The profiles of the armature and active seat are designed so that actual areas of direct contact are relatively small, and the adjacent areas through which the magnetic flux flows are separated by a very small air gap.

As illustrated by the double-hatched areas in FIGS. 2–4, only the areas of direct contact between the armature 34 and supply seat surface 32 are case hardened. With respect to the supply seat surface 32, the case hardening is substantially limited to inner periphery of stem 24, as best seen in FIG. 3. The armature end surface 68 is generally elliptical, as indicated above, in order to reduce hydraulic retention of the armature 34 and to limit its area of contact with supply seat surface 32 primarily to the case hardened inner periphery of stem 24. This central contacting portion of the armature end surface 68 is case hardened to minimize wear and residual mannetism thereof as best seen in FIG. 2. The end surface 66 of armature 34 is also case hardened as depicted in FIG. 2 for improved durability.

According to the preferred embodiment, the selective case hardening of the armature 34 and stem 24 is achieved by carburizing both parts to a total case depth of approximately 0.50 mm, using a water quench. Thereafter, a grinding process is employed to remove the case hardening in the areas not double-hatched in FIGS. 2–4.

While this invention has been described in reference to the illustrated embodiment, various modifications will occur to those skilled in the art. For example, this invention is equally applicable to normally closed valves, and may be practiced in its broadest sense by using selective hardening techniques other than described herein. In this regard, it will be understood that valves incorporating such modifications may fall within the scope of this invention, which is defined by the appended claims.

The embodiments of the invention in which an exclusive property or privilege is claimed are defined as follows:

1. A pulse-width-modulated valve having an armature axially movable between a first position in which it is seated against a first seat, and a second position in which it is seated against a second seat, resilient means for biasing the armature into engagement with the first seat, and magnetic circuit means selectively activatable to establish a flow of magnetic flux through a flux path including the armature and the second seat for overcoming the bias of said resilient means and moving the armature into engagement with the second seat, the improvement wherein:
   the armature and second seat are formed of magnetic flux conducting material;
   the surfaces of the armature and second seat which come into direct contact upon activation of said magnetic circuit means are case hardened to minimize wear and residual magnetization thereof; and
   the surfaces of the armature and second seat which are adjacent such direct contact surfaces are substantially free of the case hardening to permit substantially unrestricted flow of magnetic flux between the armature and second seat during activation of said magnetic circuit.

2. A pulse-width-modulated valve comprising a magnetic armature axially movable between a first position in which it engages a first seat, and a second position in which it engages a second magnetic seat, resilient means for biasing the armature into engagement with the first seat, and magnetic circuit means selectively activatable to establish a flow of magnetic flux through a flux path including a stationary magnetic element, the armature and the second seat for overcoming the bias of said resilient means and seating the armature against the second seat, the improvement wherein:
   the second seat is defined by a seating surface formed on one end of a cylindrical stem formed of magnetic flux conducting material;
   the armature is formed of magnetic flux conducting material;
   the armature and seating surface are shaped such that the area of direct contact therebetween when the magnetic circuit is activated to seat the armature against the second seat is less than the area o the seating surface;
   the surfaces of the armature and stem which correspond to said area of direct contact are case hardened to minimize wear and residual magnetism thereof; and
   the surfaces of the armature and stem which are adjacent said area of direct contact are substantially free of the case hardening to permit substantially unrestricted flow of magnetic flux between the armature and the stem during activation of said magnetic circuit.

3. The improvement set forth in claim 2, wherein:

the armature and seating surface are shaped such that the area of direct contact therebetween when the magnetic circuit is activated to seat the armature against the second seat is limited substantially to the inner periphery of the seating surface; and the inner periphery of the stem is case hardened at least in the vicinity of said seating surface so that the areas of direct contact are case hardened to minimize wear and residual magnetism thereof, and the areas of the armature and seating surface adjacent said areas of direct contact are substantially free of case hardening to permit substantially unrestricted flow of magnetic flux between the armature and the stem during activation of said magnetic circuit.

4. The improvement set forth in claim 3, wherein:

the seating surface on said stem is generally conical in shape; and the surface of the armature which seats against the stem is generally elliptical in shape.

* * * * *